United States Patent
Lorsakul et al.

(10) Patent No.: US 12,361,550 B2
(45) Date of Patent: Jul. 15, 2025

(54) CORRECTING DIFFERENCES IN MULTI-SCANNERS FOR DIGITAL PATHOLOGY IMAGES USING DEEP LEARNING

(71) Applicant: Ventana Medical Systems, Inc., Tucson, AZ (US)

(72) Inventors: Auranuch Lorsakul, Santa Clara, CA (US); Zuo Zhao, Mountain View, CA (US); Yao Nie, Sunnyvale, CA (US); Xingwei Wang, Sunnyvale, CA (US); Kien Nguyen, Seattle, WA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 325 days.

(21) Appl. No.: 18/170,788

(22) Filed: Feb. 17, 2023

(65) Prior Publication Data
US 2023/0230242 A1     Jul. 20, 2023

Related U.S. Application Data

(63) Continuation of application No. PCT/US2021/046678, filed on Aug. 19, 2021.
(Continued)

(51) Int. Cl.
*G06T 7/00* (2017.01)

(52) U.S. Cl.
CPC .. *G06T 7/0012* (2013.01); *G06T 2207/20084* (2013.01)

(58) Field of Classification Search
CPC .............. G06T 7/0012; G06T 2207/20084
(Continued)

(56) References Cited

U.S. PATENT DOCUMENTS

2014/0233826 A1*  8/2014  Agaian ............... G06V 20/698
                                                               382/133
2022/0084264 A1*  3/2022  Dawant ................. G06T 3/147
(Continued)

FOREIGN PATENT DOCUMENTS

| JP | 2018192264 A | 12/2018 |
|---|---|---|
| JP | 2020502665 A | 1/2020 |
| WO | 2019199699 A1 | 10/2019 |
| WO | 2020139835 A1 | 7/2020 |

OTHER PUBLICATIONS

Pandey et al., "Target-Independent Domain Adaptation for WBC Classification Using Generative Latent Search", IEEE Transactions On Medical Imaging, vol. 39, Issue 12, Jul. 2020, pp. 3979-3991.
(Continued)

*Primary Examiner* — Allen H Nguyen
(74) *Attorney, Agent, or Firm* — Kilpatrick Townsend & Stockton LLP

(57) ABSTRACT

The present disclosure relates to techniques for transforming digital pathology images obtained by different slide scanners into a common format for image analysis. Particularly, aspects of the present disclosure are directed to obtaining a source image of a biological specimen, the source image is generated from a first type of scanner, inputting into a generator model a randomly generated noise vector and a latent feature vector from the source image as input data, generating, by the generator model, a new image based on the input data, inputting into a discriminator model the new image, generating, by the discriminator model, a probability for the new image being authentic or fake, determining whether the new image is authentic or fake based on the generated probability, and outputting the new image when the image is authentic.

20 Claims, 9 Drawing Sheets
(4 of 9 Drawing Sheet(s) Filed in Color)

Related U.S. Application Data

(60) Provisional application No. 63/068,585, filed on Aug. 21, 2020.

(58) Field of Classification Search
USPC .......................................................... 382/128
See application file for complete search history.

(56) References Cited

U.S. PATENT DOCUMENTS

| | | | |
|---|---|---|---|
| 2023/0068727 A1* | 3/2023 | Saphier | G06T 17/20 |
| 2025/0005942 A1* | 1/2025 | Panetta | G06T 7/0012 |

OTHER PUBLICATIONS

PCT/US2021/046678, "International Search Report and Written Opinion", Dec. 2, 2021, 12 pages.

Ren et al., "Adversarial Domain Adaptation for Classification of Prostate Histopathology Whole-Slide Images", ICIAP: International Conference on Image Analysis And Processing, 2018, pp. 201-209.

Zhang et al., "Covid-DA: Deep Domain Adaptation from Typical Pneumonia to Covid-19", Cornell University, 2020, 8 pages.

Zhang et al., "Noise Adaptation Generative Adversarial Network for Medical Image Analysis", IEEE Transactions on Medical Imaging, 2019, pp. 1-11.

JP Application No. 2023-512309, "Notice of Allowance", Jun. 3, 2024, 6 pages.

JP Application No. 2023-512309, "Office Action", Jan. 26, 2024, 9 pages.

Koga et al., "Extracting and Visualization of Essential Features for Staining Translation of Pathological Images", Institute of Electronics, Information and Communication Engineers Technical Report, vol. 119, No. 399, Jan. 22, 2020, pp. 215-218.

EP Application No. 21769586.5, "Office Action", Mar. 31, 2025, 7 pages.

* cited by examiner (A) iScan HT Wholeslide Image (B) DP200 Wholeslide Image Improved Image Quality

CORRECTING DIFFERENCES IN MULTI-SCANNERS FOR DIGITAL PATHOLOGY IMAGES USING DEEP LEARNING

CROSS-REFERENCE TO RELATED APPLICATIONS

The present application is a continuation of International Application No. PCT/US2021/046678, filed Aug. 19, 2021, and claims the benefit of and the priority to U.S. Provisional Application No. 63/068,585, filed on Aug. 21, 2020, each of which are hereby incorporated by reference in their entireties for all purposes.

FIELD

The present disclosure relates to digital pathology, and in particular to techniques for transforming digital pathology images obtained by different slide scanners into a common format for image analysis.

BACKGROUND

Digital pathology involves the interpretation of digitized images in order to correctly diagnose patients and guide therapeutic decision making. Whole slide imaging (WSI) is an imaging modality used in digital pathology that scans preselected areas or entire slides of tissue samples (e.g., histopathology or cytopathology glass slides) into digital images. The process of digitization includes four sequential parts: image acquisition (scanning), storage, editing, and display of images. The image acquisition is performed by whole slide scanners that typically have a light source, a slide stage, objective lenses, and a high-resolution camera for image capture. The whole slide scanners capture images of tissue sections tile by tile or in a line-scanning fashion. The multiple images (tiles or lines, respectively) are captured and digitally assembled ("stitched") to generate a digital image of a preselected area or the entire slide. When pairing scanners with slide staining techniques, WSI can be categorized as brightfield, fluorescent, and multispectral. Some scanners can accommodate more than one modality, for example enabling both brightfield and fluorescent scanning. Brightfield scanning emulates standard brightfield microscopy and is a cost-effective approach. Fluorescent scanning is similar to fluorescent microscopy and is used to digitize fluorescently labeled slides (e.g., fluorescent immunohistochemistry (IHC), fluorescent in situ hybridization, etc.). Multispectral imaging captures spectral information across the spectrum of light and can be applied to both the brightfield and fluorescent settings.

Many WSI systems include image viewing software that can be installed locally on user computers. Other vendors offer this ability as part of a larger software suite residing on network servers, enabling users to view whole slide images on their own devices via a network connection. For users who wish to apply image analysis algorithms to whole slide images, some of the image viewing software provided by vendors are packaged with algorithms that can detect cells, compute positive staining, perform regional segmentation, or perform nuclear segmentation in hematoxylin-eosin (H&E) images. For users looking for more sophisticated or specialized image analysis algorithms than their scanner vendor provides, a number of software solutions are available with various capabilities from third part vendors. These image analysis algorithms can often be integrated into a department's workflow, providing on demand image analysis in conjunction with whole slide viewing. However, most image analysis algorithms are trained on images from specific whole slide scanners (i.e., developed for specific whole slide scanners), and thus may operate only on digital images having particular characteristics from those whole slide scanner. The characteristics of some digital images generated by different types or models of digital slide scanners may be incompatible with the image analysis algorithm. Accordingly, there is a desire for image analysis algorithms to be scanner agnostic (operate on images obtained by any type of scanner).

SUMMARY

In various embodiments, a computer-implemented method is provided that includes obtaining a source image of a biological specimen, where the source image is generated from a first type of scanner; inputting into a generator model a randomly generated noise vector and a latent feature vector from the source image as input data; generating, by the generator model, a new image based on the input data; inputting into a discriminator model the new image; generating, by the discriminator model, a probability for the new image being authentic or fake, where authentic means the new image has characteristics that are similar to characteristics of a target image, and fake means the new image does not have the characteristics that are similar to the characteristics of the target image, and where the characteristics of the target image are associated with a second type of scanner that is different from the first type of scanner; determining whether the new image is authentic or fake based on the generated probability; and outputting the new image when the image is authentic.

In some embodiments, the biological specimen is mounted on a pathology slide, the first type of scanner is a first type of whole slide imaging scanner, and the second type of scanner is a second type of whole slide imaging scanner.

In some embodiments, the computer-implemented method further comprises inputting into an image analysis model the new image, where the image analysis model comprises a plurality of model parameters learned using a set of training data comprising images obtained from a same type of scanner as the second type of scanner; analyzing, by the image analysis model, the new image; generating, by the image analysis model, an analysis result based on the analyzing of the new image; and outputting the analysis result.

In some embodiments, the image analysis model is not trained on images obtained from a same type of scanner as the first type of scanner.

In some embodiments, the computer-implemented method further comprises training an image analysis model using a set of training data comprising the new image.

In some embodiments, the GAN model comprises a plurality of model parameters learned using a set of training data comprising one or more pairwise sets of images, where each pair of images within the one or more pairwise sets of images comprises a first image generated by the first type of scanner and a second image generated by the second type of scanner; and where the plurality of model parameters are learned using the set of training data based on minimizing a first loss function to train the discriminator model to maximize a probability of the set of training data and a second loss function to train the discriminator model to minimize a probability of a generated image sampled from the generator model and train the generator model to maximize the probability that the discriminator model assigns to the generated image.

In some embodiments, the computer-implemented method further comprises determining, by a user, a diagnosis of a subject based on the analysis result.

In some embodiments, the computer-implemented method further comprises administering, by the user, a treatment with a compound based on (i) the analysis result, and/or (iii) the diagnosis of the subject.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

I. OVERVIEW

Evaluation of tissue changes caused, for example, by disease, may be performed by examining thin tissue sections. Tissue samples may be sliced to obtain a series of sections (e.g., 4-5 μm sections), and each tissue section may be stained with different stains or markers to express different characteristics of the tissue. Each section may be mounted on a slide and scanned to generate a digital image for analysis with a computerized digital pathology image analysis algorithm. Various types or models of digital pathology slide scanners may be used to scan and generate the digital images. For example, digital images of the pathology slides may be scanned and generated using VENTANA® DP 200 slide scanners, VENTANA iScan® HT slide scanners, Aperio AT2 slide scanners, or other types of slide scanners. It is possible to manually assess the tissue within the digital images using image viewer software, or to automatically analyze it with an image analysis algorithm that detects and classifies biological objects of interest.

Figure 1:
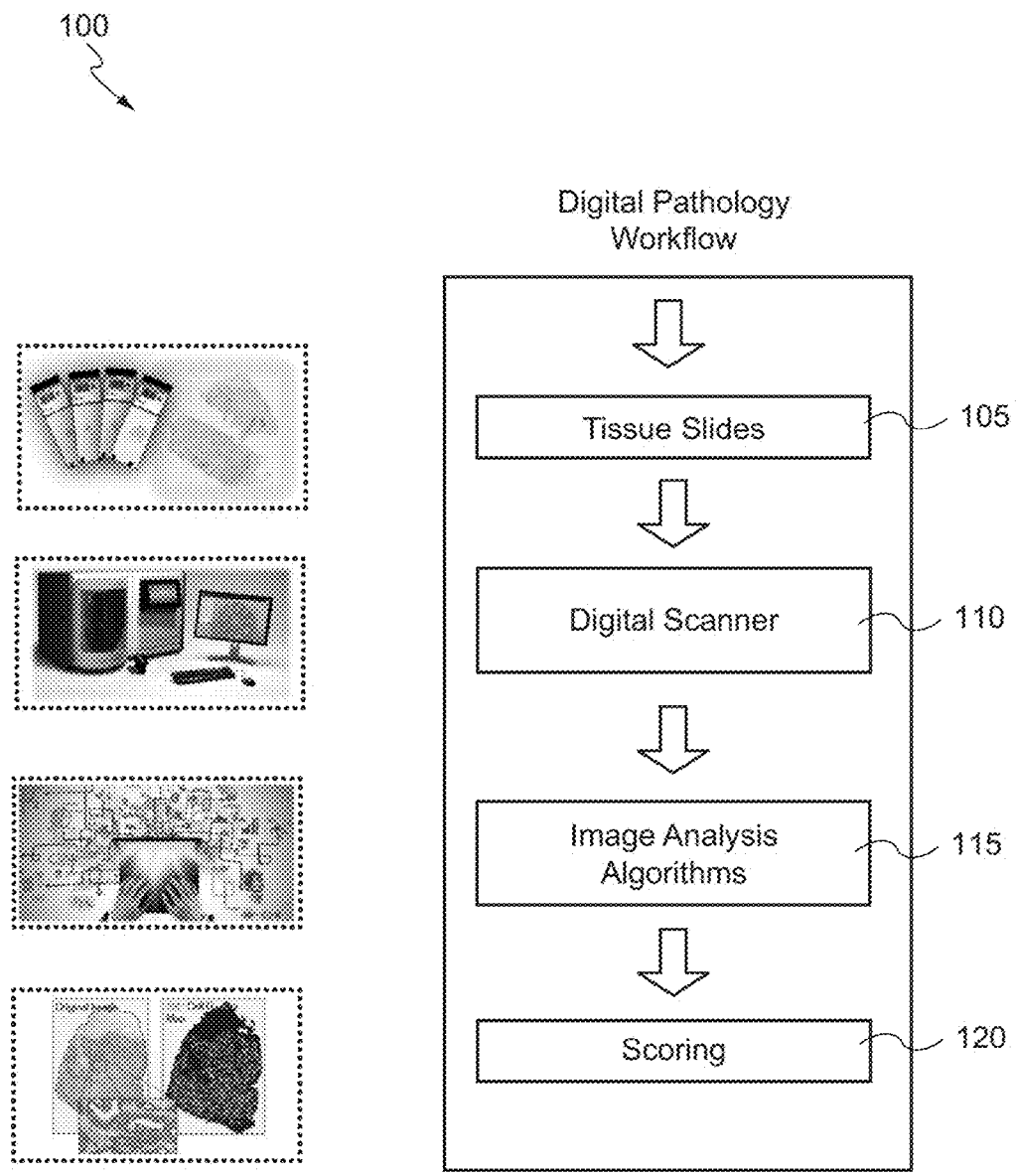
FIG. 1 shows a digital pathology workflow according to various embodiments.

In digital pathology solutions, image-analysis workflows can be established to automatically detect or classify biological objects of interest e.g., positive, negative tumor cells, etc. FIG. 1 shows an example diagram of a digital pathology solution workflow 100. The digital pathology solution workflow 100 includes obtaining tissue slides at block 105, scanning preselected areas or the entirety of the tissue slides with a digital image scanner (e.g., A WSI scanner) to obtain digital images at block 110, performing image analysis on the digital image using one or more image analysis algorithms at block 115, and scoring objects of interest based on the image analysis (e.g., quantitative or semi-quantitative scoring such as positive, negative, medium, weak, etc.).

Figure 2:
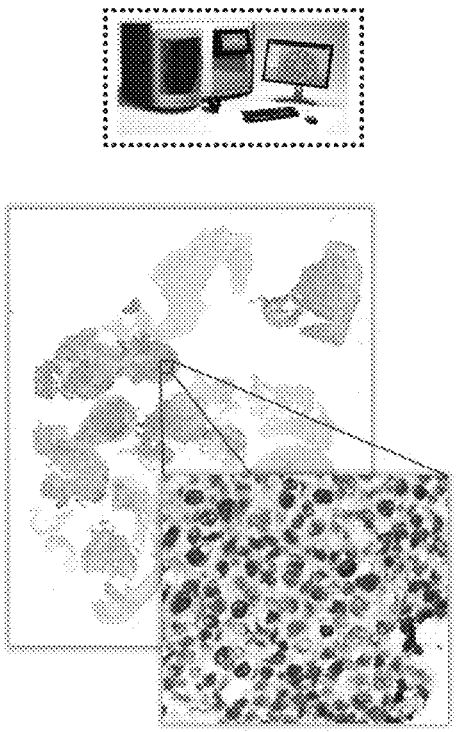
FIG. 2 shows a comparison of digital images obtained from two different digital pathology scanners according to various embodiments.
Figure 2:
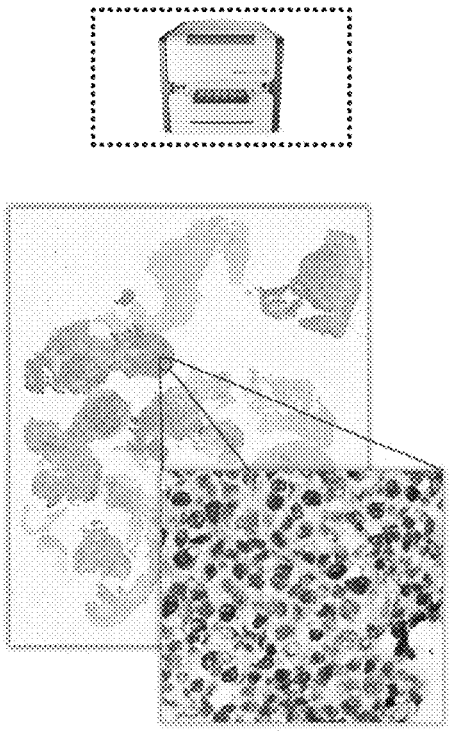

In many instances, image analysis algorithms used in digital pathology solution workflows as described with respect to FIG. 1 are required to be modified due to possible changes of hardware (e.g., digital scanners) or staining protocols. For example, the VENTANA® DP 200 slide scanners for high-quality and high-resolution gradually replaced the former VENTANA iScan® HT slide scanners. FIG. 2 shows examples of a tissue slide scanned using VENTANA iScan® HT (A) and VENTANA® DP 200 (B) whole slide scanners, respectively. Evidence has shown that images obtained from these two scanners are different (i.e., images obtained from one scanner have different characteristics (e.g., improved contrast and/or resolution) as compared to images obtained from the other scanner). Several legacy image analysis algorithms developed based on images obtained using VENTANA iScan® HT scanners may not achieve best performance when applying them to process images obtained from VENTANA® DP 200 scanners. For example, experiments have shown that the performance of the algorithm results may be substandard when directly applying the original algorithms developed for the VENTANA iScan® HT to images obtained by the VENTANA® DP 200 scanners. As a result, it has become needed to continuously update or modify the image analysis algorithms, which requires additional resources, cost, and time. In general, it can take upwards of six months to develop an image analysis algorithm for a new scanner, and when multiple image analysis algorithms are being implemented by new scanners, the effects of the problem can be compounded. It should be understood that although this problem was initially identified with proprietary scanners, many digital pathology scanners and solution workflows in the digital pathology industry suffer from this same problem.

In order to overcome these limitations as well as others, techniques are disclosed herein for using a deep learning based generative model known as Generative Adversarial Networks (GANs) to transform a source set of images obtained from a first digital image scanner (e.g., a VENTANA® DP 200 scanner) into new generated set of images with their characteristics similar to a target set of images obtainable from a second image scanner (e.g., a VENTANA iScan® HT). GANs can learn to estimate two distributions (e.g., characteristics from the source set of images and characteristics from the target set of images), which can be used to transform examples from one distribution (e.g., the source set of images) into the other distribution (e.g., the target set of images). Once the GANs are trained to transform the source set of images obtained from the first digital image scanner into the new generated set of images having characteristics similar to the target set of images, the new generated set of images can be analyzed using an imaging analysis algorithm trained on images from the second digital image scanner without having to re-develop the image analysis algorithm and with minimized cost and time.

Figure 3:
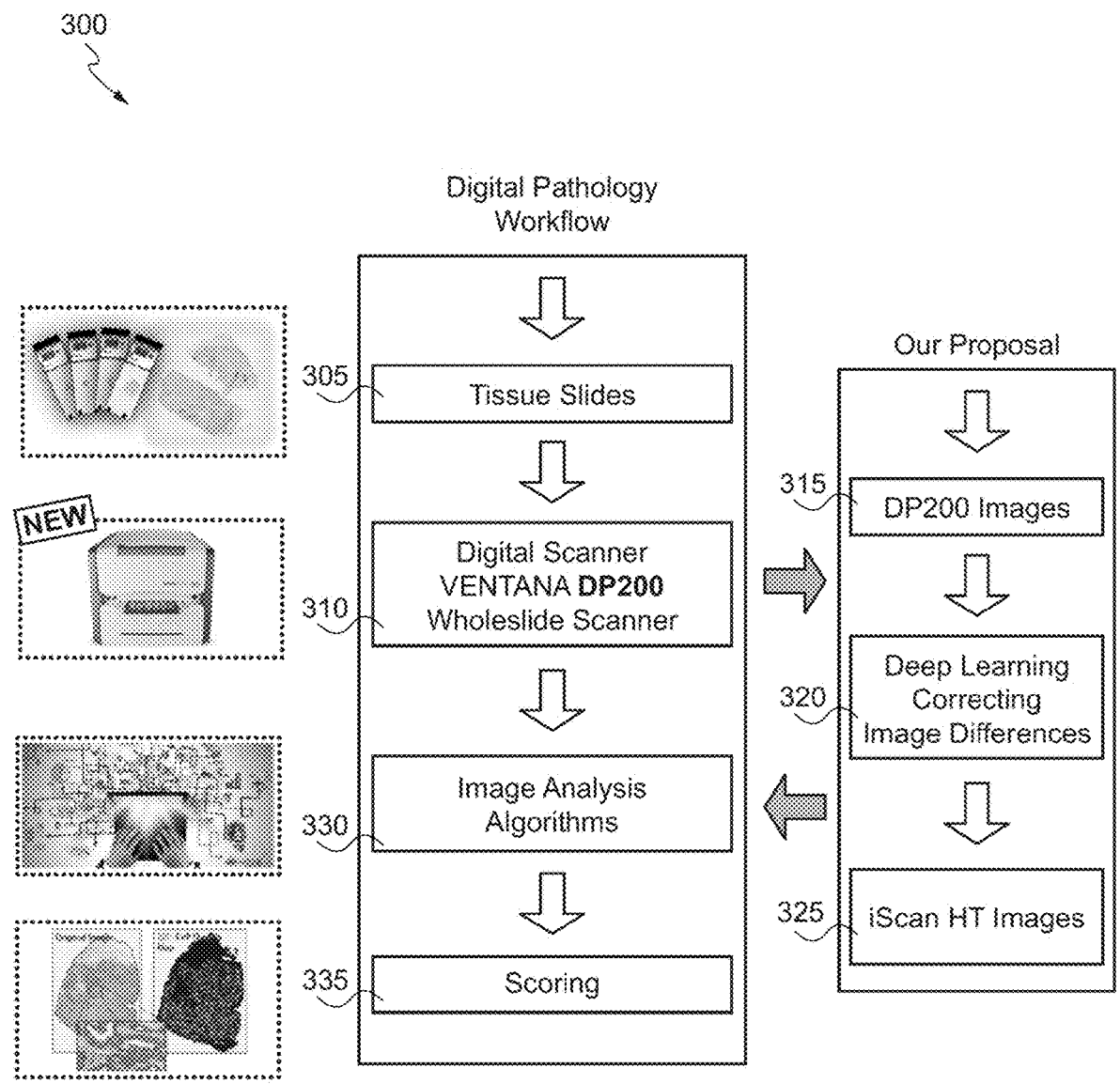
FIG. 3 shows an alternative digital pathology workflow according to various embodiments.

FIG. 3 shows an example diagram of a digital pathology solution workflow 300 in accordance with aspects of the present disclosure. The digital pathology solution workflow 300 includes obtaining tissue slides at block 305, and scanning preselected areas or the entirety of the tissue slides with a first digital image scanner (images from the first digital image scanner were not used to train an image analysis algorithm) to generate a set of source digital images at block 310. Because images from the first digital image scanner were not used to train the image analysis algorithm, the set of source digital images are obtained at block 315 and input into the deep learning based generative model at block 320 to transform the set of source digital images into a new generated set of images with their characteristics similar to a target set of images obtainable from a second digital image scanner (images from the second digital scanner were used to train an image analysis algorithm) at block 325. At block 330 image analysis is performed on the new generated set of images using the image analysis algorithm and at block 335 objects of interest are scored based on the image analysis (e.g., quantitative or semi-quantitative scoring such as positive, negative, medium, weak, etc.). Accordingly, image differences between these two digital image scanners can be rectified and legacy image analysis algorithms can be applied to images obtained from the scanner that was not used to train the legacy image analysis algorithms.

One illustrative embodiment of the present disclosure is directed to a method that includes: obtaining a source image of a biological specimen, where the source image is generated from a first type of scanner; inputting into a generator model a randomly generated noise vector and a latent feature vector (or a one dimensional vector) of features from the source image as input data; generating, by the generator model, a new image based on the input data; inputting into a discriminator model the new image; generating, by the discriminator model, a probability for the new image being authentic or fake, where authentic means the new image has characteristics that are similar to characteristics of a target image, and fake means the new image does not have the characteristics that are similar to the characteristics of the target image, and where the characteristics of the target image are associated with a second type of scanner that is different from the first type of scanner; determining whether the new image is authentic or fake based on the generated probability; and outputting the new image when the image is authentic.

Advantageously, these techniques can render computerized digital image analysis algorithms scanner agnostic by transforming digital images produced by different digital scanners into images that can be analyzed using existing computerized digital image analysis algorithms, and correct for image variations in images obtained from different imaging sites. These techniques can also be used for future algorithm development for any new generation scanner, such that the images scanned by other scanners can be transformed and leveraged as training data for the new generation scanner. Moreover, these techniques can be used to transfer data from different sites to correct for variations due to pre-analytical conditions, which is one of the main challenges for development of image analysis algorithms.

II. DEFINITIONS

As used herein, when an action is "based on" something, this means the action is based at least in part on at least a part of the something.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

As used herein, the term "sample" "biological sample" or "tissue sample" refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

III. TECHNIQUES FOR DIGITAL PATHOLOGY IMAGE TRANSFORMATION

Computerized digital image analysis algorithms are available to analyze pathology images obtained from a particular digital pathology slide scanner (a particular type of scanner, for example, a particular scanner from a certain manufacturer or a particular scanner model). In such cases, analysis of digital pathology images from different digital pathology slide scanners using image analysis algorithms trained on images from the particular digital pathology slide scanner may not achieve the desired effect or accuracy. According to various aspects of the present disclosure, digital pathology images obtained from the different slide scanners are transformed into images having characteristics similar to images from the particular digital pathology slide scanner such that the image analysis algorithms can be used to achieve the desired effect or accuracy.

Figure 4:
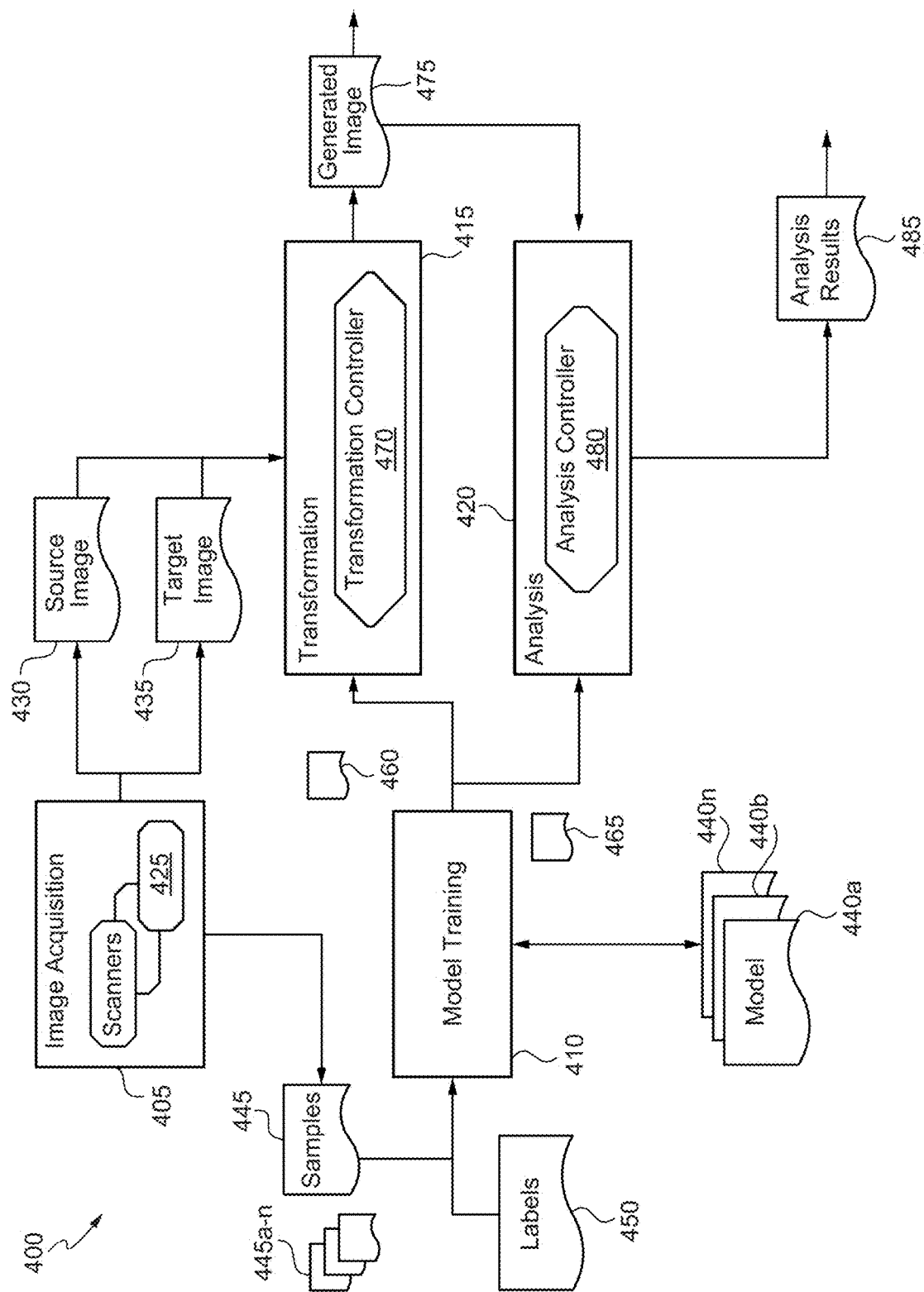
FIG. 4 shows an example computing environment for segmenting instances of an object of interest according to various embodiments

FIG. 4 illustrates an example computing environment 400 (i.e., a data processing system) for to transform a set of source digital images obtained from a first digital image scanner into a new generated set of images with their characteristics similar to a target set of images obtainable from a second digital image scanner according to various embodiments. As shown in FIG. 4, the transforming of the source set of images performed by the computing environment 400 in this example includes several stages: an image acquisition stage 405, a model training stage 410, a transformation stage 415, and an analysis stage 420. The image acquisition stage 410 includes digital image scanners 425 for obtaining a source set of digital images 430 and a target set of digital images 435 from preselected areas or the entirety of the biological sample slides (e.g., tissue slides). The digital image scanners 425 include a first type of digital image scanner for obtaining the source set of digital images 430 and a second type of digital image scanner for obtaining the target set of digital images 435.

The model training stage 410 builds and trains one or more models 440a-440n ('n' represents any natural number) (which may be referred to herein individually as a model 440 or collectively as the models 440) to be used by the other stages. The model 440 can be a machine-learning ("ML") model, such as a convolutional neural network ("CNN"), an inception neural network, a residual neural network ("Resnet"), a U-Net, a V-Net, a single shot multibox detector ("SSD") network, a recurrent neural network ("RNN"), a rectified linear unit ("ReLU"), a long short-term memory ("LSTM") model, a gated recurrent units ("GRUs") model, the like, or any combination thereof. In various embodiments, the model 440 is a generative model capable of learning any kind of data distribution using unsupervised learning, such as a Generative Adversarial Network ("GAN"), a deep convolutional generative adversarial network ("DCGAN"), variation autoencoders (VAEs), a hidden Markov model ("HMM"), Gaussian mixture model, Boltzmann machine, the like, or combinations of one or more of such techniques—e.g., VAE-GAN. The computing environment 400 may employ the same type of model or different types of models for transforming source images into generated images. In certain instances, model 440 is a GAN constructed with a loss function that tries to classify if the output image is real or fake, while simultaneously training a generative model to minimize this loss.

Figure 5:
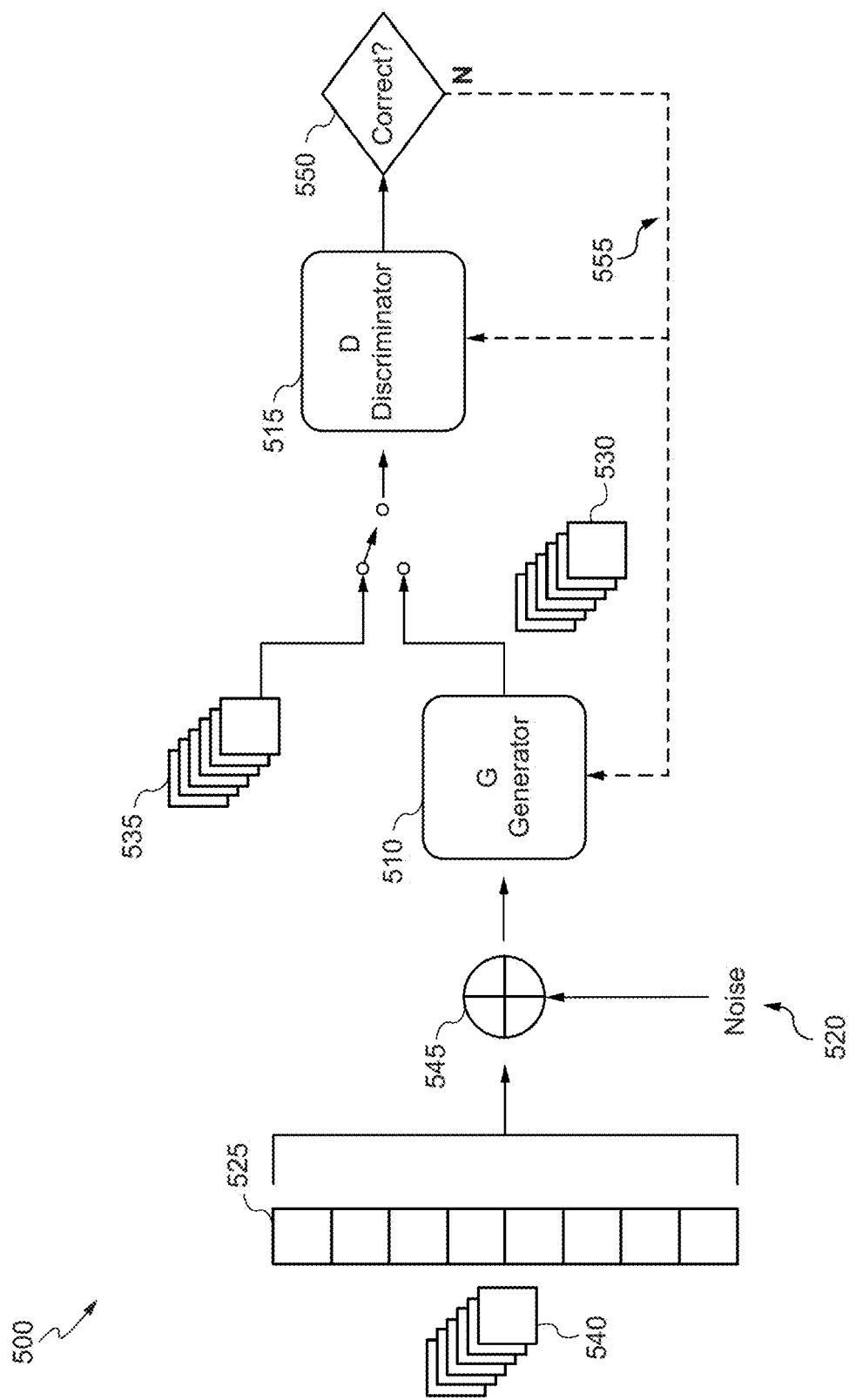
FIG. 5 shows a Generative Adversarial Network (GAN) according to various embodiments.

In an exemplary embodiment show in FIG. 5, the model is a conditional GAN ("CGAN") 500, which is an extension of the GAN model, and generates images that have certain conditions or attributes. A CGAN learns a structured loss that penalizes the joint configuration of the output. Referring to FIG. 5, the CGAN 500 includes a generator 510 and a discriminator 515. The generator 510 is a neural network (e.g., a CNN) that takes a randomly generated noise vector 520 and a latent feature vector (or a one dimensional vector) 525 (the condition, e.g., in the present instance the source image) as input data and feedback from the discriminator 515 and generates new images 530 that are as close to real target images 535 as possible. In some instances, the generator 510 utilizes a "U-Net" architecture comprised of a encoder-decoder network, with skip layers added between down-sampling and up-sampling layers. The discriminator 515 is a neural network (e.g., a CNN) configured as a classifier to determine whether the generated image 530 from the generator 510 is a real image or a fake image. In some instances, the discriminator utilizes a "PatchGAN" architecture with a patch by patch basis. The latent feature vector 525 or the condition is derived from a source image or set of source images 540 (e.g., images from a first digital scanner), which encode the class (e.g., a tissue sample with n number of biomarkers or stains) or a set of specific characteristics expected from the source image 540. The randomly generated noise vector 520 may be generated from a Gaussian distribution, and the vector space may be comprised of latent variables or hidden variables that are important for the domain but not directly observable. The latent feature vector 525 and the random noise vector 520 may be combined as input 545 to the generator 510.

The generator 510 takes the combined input 545 and generates the image 530 based on the latent feature vector 525 and the random noise vector 520 in the problem domain (i.e., domain of characteristics associated with a target images 535). The discriminator 515 performs conditional-image classification by taking both the target image 535 (e.g., images from a second digital scanner) and the generated image 530 as input and predicts 550 the likelihood of whether generated image 530 is real or a fake translation of the target image 535. The output of discriminator 515 depends on the size of the generated image 530 but may be one value or a square activation map of values. Each value is a probability for the likelihood that a patch in the generated image 530 is real. These values can be averaged to give an overall likelihood or classification score if needed. The loss function of both the generator 510 and discriminator 515 is highly dependent on how well the discriminator 515 performs its job of predicting 550 the likelihood of whether generated image 530 is real or a fake translation of the target image 535. After sufficient training, the generator 510 will become better, and the generated images 530 will begin to look more like the target images 535. Training of the GAN 500 may be completed when the generated images 530 have characteristics similar to the target images 535 such that the discriminator is no longer able to discern real from fake. Once trained, a source set of images obtained from a first digital image scanner may be input into the GAN 500 to transform the source set of images into a new generated set of images with their characteristics similar to a target set of images obtained from the second image scanner. Thereafter, the new generated set of images can be analyzed using currently available computerized digital pathology image analysis algorithms.

With reference back to FIG. 4, to train a model 440 in this example, samples 445 are generated by acquiring digital images (a source set of digital images 430 and a target set of digital images 435), splitting the images into pairwise subsets of images 445a (at least one pair of a source image and a target image) for training (e.g., 90%) and pairwise subsets of images 445b for validation (e.g., 10%), preprocessing the pairwise subsets of images 445a and the pairwise subset of images 145b, augmenting the pairwise subset of images 445a, and in some instances annotating the pairwise subset of images 445a with labels 450. The pairwise subset of images 445a are acquired from one or more imaging modalities (e.g., a WSI scanner). In some instances, the pairwise subset of images 445a are acquired from a data storage structure such as a database, an image system (e.g., digital image scanners 425), or the like associated with the one or more imaging modalities. Each image depicts a biological sample such as tissue.

The splitting may be performed randomly (e.g., a 90/10%, 80%/20% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The preprocessing may comprise cropping the images such that each image only contains a single object of interest. In some instances, the preprocessing may further comprise standardization or normalization to put all features on a same scale (e.g., a same size scale or a same color scale or color saturation scale). In certain instances, the images are resized with a minimum size (width or height) of predetermined pixels (e.g., 2500 pixels) or with a maximum size (width or height) of predetermined pixels (e.g., 3000 pixels) and kept with the original aspect ratio.

For example, a number of patched images from a first scanner and a second scanner may be prepared as one or more pairwise subsets of images for training data. The preparation of the paired images may comprise acquiring slides of a biological sample, for example, IHC slides having one or more biomarker expressions such as CD34-aSMA, FAP/PanCK, Perforin/CD3, Ki67/CD8, FoxP3, PD1, the like, or any combination thereof. Each slide is scanned using both the first scanner and the second scanner to acquire whole slide images. The whole slide images may then be cropped to the predetermined size (e.g., 128×128) into a number of patched images Pairs of patched images from the first scanner and the second scanner are selected and registered (aligning two or more images of the same object or scene). The registration may comprise designating one image from one of the scanners as the reference image, also called the fixed image, and applying geometric transformations or local displacements to the other image from the other scanner so that the other image aligns with the reference image. This process results in one or more pairwise subsets of images for training data.

Figure 6:
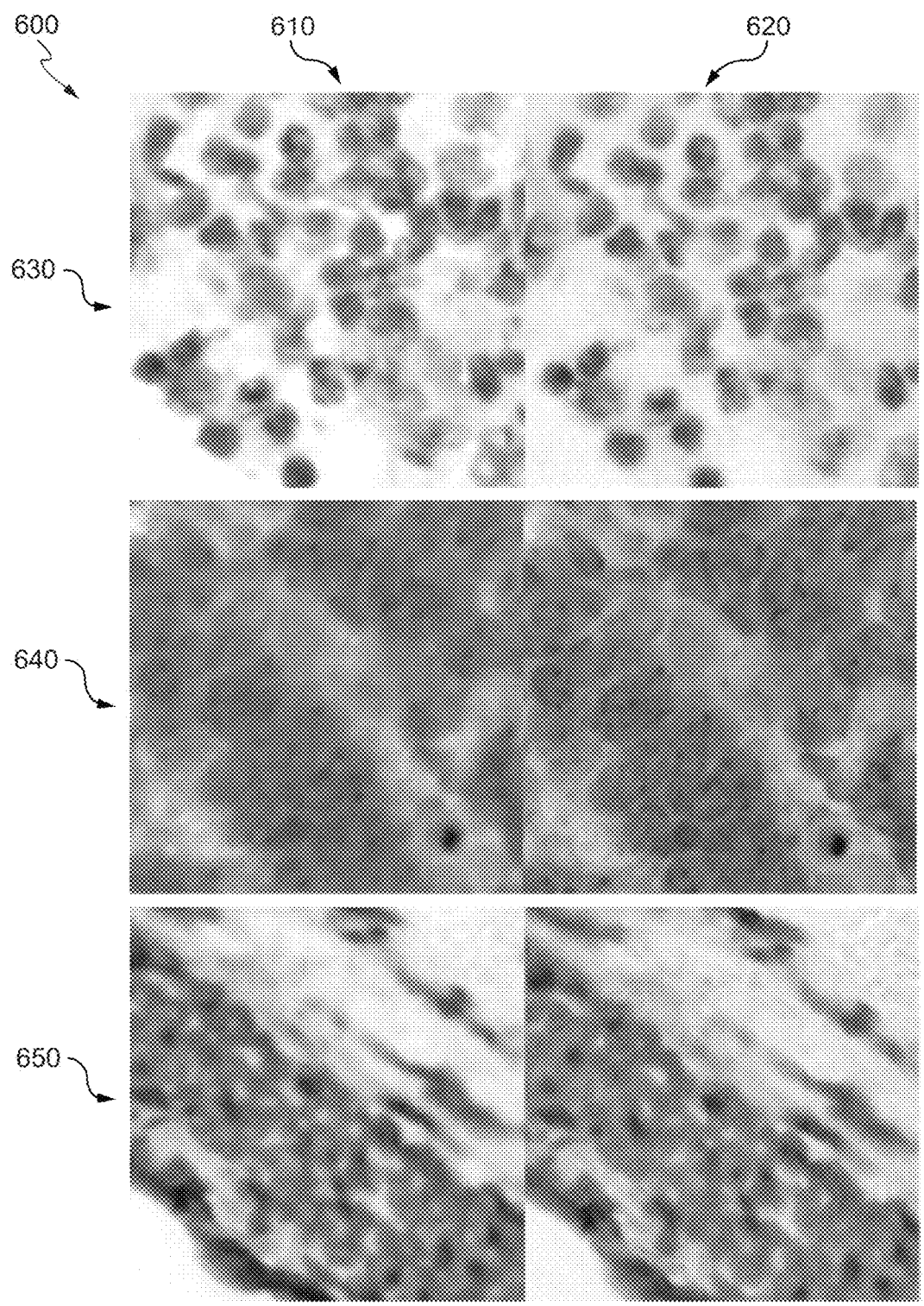
FIG. 6 shows examples of paired training images from a first digital pathology slide scanner and a second digital pathology slide scanner with registration according to various embodiments.

FIG. 6 shows examples of paired training images 600 from a first digital slide scanner and a second digital slide scanner with registration according to some aspects of the present disclosure. Referring to FIG. 6, the images in the left-hand column 610 are the source images from a first digital slide scanner (e.g., VENTANA® DP 200) and the images in the right-hand column 620 are the target images from the second digital slide scanner (e.g., VENTANA iScan® HT). The first row 330 is a first pair of training images, the second row 340 is a second pair of training images, and the third row 350 is a third pair of training images. The source and target images may each have a patch size of 128×128 pixels or another size. The 128×128 pixel patches may be input to the GAN or CGAN to train the deep learning network.

With respect back to FIG. 4, augmentation can be used to artificially expand the size of the pairwise subset of images 445a by creating modified versions of images in the datasets. Image data augmentation may be performed by creating transformed versions of images in the datasets that belong to the same class as the original image. Transforms include a range of operations from the field of image manipulation, such as shifts, flips, zooms, and the like. In some instances, the operations include random erasing, shifting, brightness, rotation, Gaussian blurring, and/or elastic transformation to ensure that the model 440 is able to perform under circumstances outside those available from the pairwise subset of images 445a.

The training process for model 440 includes selecting hyperparameters for the model 440 and performing iterative operations of inputting images from the pairwise subset of images 445a into the model 440 to find a set of model parameters (e.g., weights and/or biases) that minimizes one or more loss or error functions for the model 440 (e.g., a first loss function to train the discriminator to maximize the probability of the image training data and a second loss function to train the discriminator to minimize the probability of the generated image sampled from the generator and train the generator to maximize the probability that the discriminator assigns to its own generated image). The hyperparameters are settings that can be tuned or optimized to control the behavior of the model 440. Most models explicitly define hyperparameters that control different aspects of the models such as memory or cost of execution. However, additional hyperparameters may be defined to adapt a model to a specific scenario. For example, the hyperparameters may include the number of hidden units of a model, the learning rate of a model, the convolution kernel width, or the number of kernels for a model. Each iteration of training can involve finding a set of model parameters for the model 440 (configured with a defined set of hyperparameters) so that the value of the loss or error function using the set of model parameters is smaller than the value of the loss or error function using a different set of model parameters in a previous iteration. The loss or error function can be constructed to measure the difference between the outputs inferred using the models 440 and the ground truth target images using the labels 450.

Once the set of model parameters are identified, the model 440 has been trained and can be validated using the pairwise subset of images 445b (testing or validation data set). The validation process includes iterative operations of inputting images from the pairwise subset of images 445b into the model 440 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of images from the subset of images 445b are input into the model 445 to obtain output (in this example, generated images with characteristics similar to a target image), and the output is evaluated versus ground truth target images using correlation techniques such as Bland-Altman method and the Spearman's rank correlation coefficients and calculating performance metrics such as the error, accuracy, precision, recall, receiver operating characteristic curve (ROC), etc.

As should be understood, other training/validation mechanisms are contemplated and may be implemented within the computing environment 400. For example, the model 440 may be trained and hyperparameters may be tuned on images from the pairwise subset of images 445a and the images from the pairwise subset of images 445b may only be used for testing and evaluating performance of the model 440. Moreover, although the training mechanisms described herein focus on training a new model 440. These training mechanisms can also be utilized to fine tune existing models 440 trained from other datasets. For example, in some instances, a model 440 might have been pre-trained using images of other objects or biological structures or from sections from other subjects or studies (e.g., human trials or murine experiments). In those cases, the models 440 can be used for transfer learning and retrained/validated using the images 430/435.

The model training stage 410 outputs trained models including one or more trained transformation models 460 and optionally one or more image analysis models 465. In some instances, a first model 460a is trained to process a source image 430 of a biological specimen. The source image 430 is generated from a first type of scanner such as a whole slide imaging scanner. The source image 430 is obtained by a transformation controller 470 within the transformation stage 415. The transformation controller 470 includes program instructions for transforming, using the one or more trained transformation models 460, the source image 430 into a new image 475 with their characteristics to the characteristics of a target image. The characteristics of the target image are associated with a second type of scanner that is different from the first type of scanner. The transformation includes: (i) inputting into a generator model (part of transformation model 460) a randomly generated noise vector and a latent feature vector from the source image 430 as input data; (ii) generating, by the generator model, a new image 475, (iii) inputting into a discriminator model (another part of model 460) the new image 475; and generating, by the discriminator model, a probability (e.g., a number between 1 and 0) for the new image 475 being authentic or fake, where authentic means the image has characteristics that are similar to the characteristics of the target image, and fake means the image does not have characteristics that are similar to the characteristics of the target image.

In some instances, the new image 475 is transmitted to an analysis controller 480 within the analysis stage 420. The analysis controller 480 includes program instructions for analyzing, using the one or more image analysis models 465, the biological sample within the new image 475; and outputting an analysis result 485 based on the analyzing. In some instances, the one or more image analysis models 465 are one or more imaging analysis algorithms (e.g., legacy image analysis algorithms) trained on images obtained from the same type of scanner as the second type of scanner associates with characteristics of the target image and/or images obtained from a different type of scanner but have substantially similar characteristics to the characteristics of the target image. Consequently, the techniques described herein can process the transformed source image 430 (i.e., the new image 475) using preexisting imaging analysis algorithms 480 without re-developing new image analysis algorithms. The analyzing of the biological sample within the new image 475 may comprise extracting measurements based on area within the new image 475, one or more cells within the new image 475, and/or objects in the new image 475 aside from cells. Area-based measurements include the most basic assessments, for example, quantifying the areas (2-dimensional) of a certain stain (e.g., chemical or IHC stain), the area of fat vacuoles, or other events present on a slide. Cell-based measurements aim at identifying and enumerating objects, e.g. cells. This identification of individual cells enables subsequent assessment of subcellular compartments. Finally, algorithms can be utilized to assess events or objects present on tissue sections that may not be comprised of individual cells. In certain instances, the preexisting imaging analysis algorithms are configured to locate cells or subcellular structures, and provide a quantitative representation of cell staining, morphology, and/or architecture that can ultimately be used to support diagnosis and prediction.

While not explicitly shown, it will be appreciated that the computing environment 400 may further include a developer device associated with a developer. Communications from a developer device to components of the computing environment 400 may indicate what types of input images are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Figure 7:
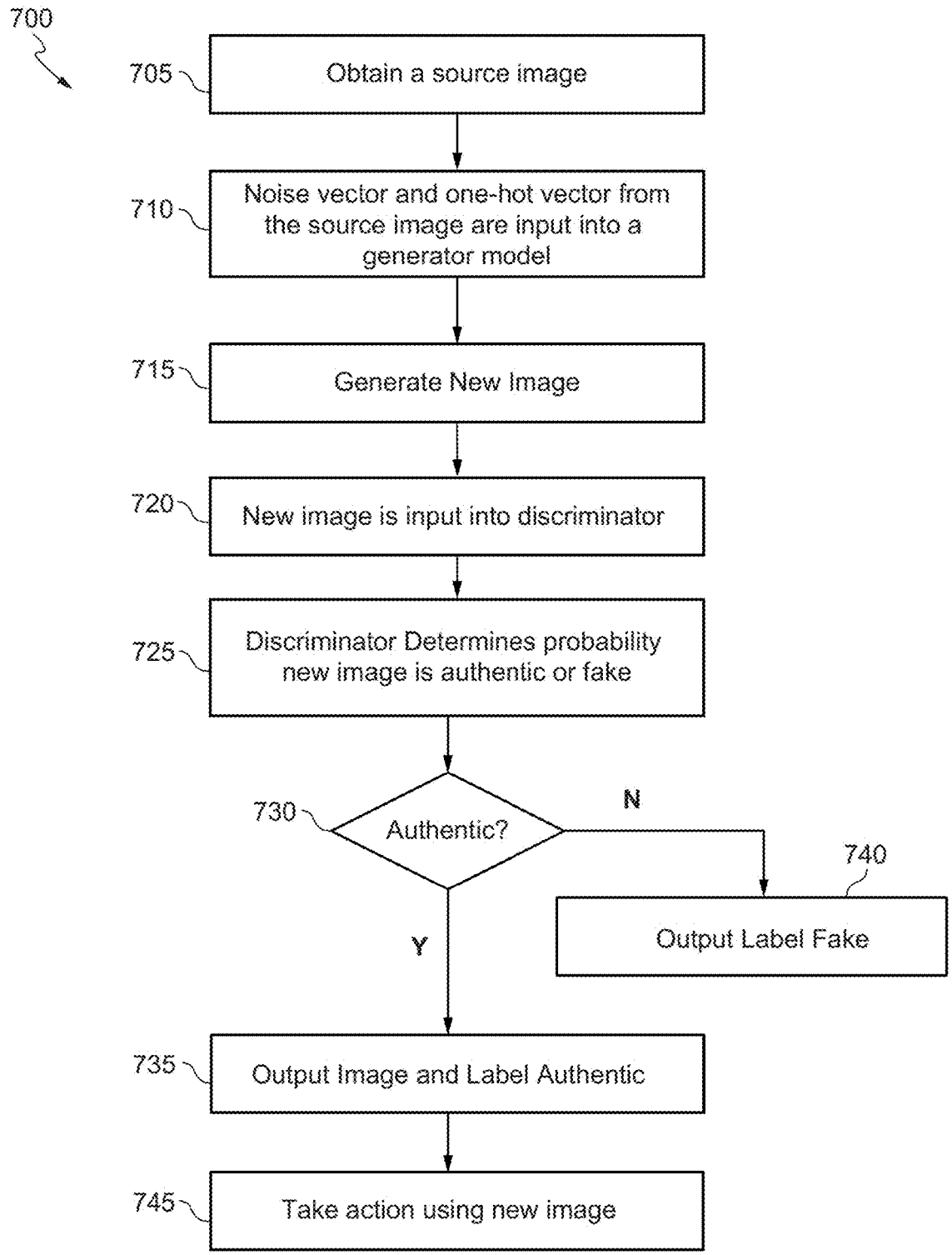
FIG. 7 shows a process for transforming a source set of images obtained from a first digital image scanner into a new generated set of images with their characteristics similar to a target set of images according to various embodiments.

FIG. 7 illustrates a flowchart for an exemplary process 700 to transform a source image (e.g., a source image from a set of source images to be processed) obtained from a first digital image scanner into a new image (e.g., a new image of a set of new images to be generated) with their characteristics similar to a target image. Process 700 may be performed using one or more computing systems, models, and networks, as described herein with respect to FIGS. 1-5. Process begins at block 705, a source image of a biological specimen is obtained. The source image is generated from a first type of scanner (e.g., a particular scanner from a certain manufacturer or a particular scanner model). At block 710, a randomly generated noise vector and a latent feature vector from the source image are input into a generator model as input data. At block 715, the generator model generates a new image based on the input data. At block 720, the new image is input into a discriminator model. At block 725, the discriminator model generates a probability for the new image being authentic or fake. Authentic means the new image has characteristics (e.g., intensity, contrast, resolution, morphology boundary/shape, etc.) that are similar to characteristics of a target image, and fake means the new image does not have the characteristics that are similar to the characteristics of the target image. The discriminator model is looking at a probability distribution of characteristics of the target image learned from normalized sample images in the training data set as compared to a probability distribution of characteristics of the new image to predict whether the new image has a higher probability for the target image to classify the new image as an authentic image, otherwise the discriminator will assign the new image as a fake image. The determination of similarity between probability distributions of characteristics of the target image and the new image may be made using cross-correlation, %Gmfyyfhmfw~~f%irxyfshj1 for other mathematical algorithms (such as the mean squared error between the target image and the new image). The characteristics of the target image are associated with a second type of scanner that is different from the first type of scanner. At block 730, a determination is made as to whether the new image is authentic or fake based on the generated probability. At block 735, the new image is output with an authentic label when the image is authentic. At step 740, the new image is output with a fake label when the image is fake.

In some instances, the generator model and the discriminator model are part of a GAN model. The GAN model comprises a plurality of model parameters learned using a set of training data comprising one or more pairwise sets of images. Each pair of images within the one or more pairwise sets of images comprises a first image generated by the first type of scanner and a second image generated by the second type of scanner. In certain instances, the plurality of model parameters are learned using the set of training data based on minimizing a first loss function to train the discriminator model to maximize a probability of the set of training data and a second loss function to train the discriminator model to minimize a probability of a generated image sampled from the generator model and train the generator model to maximize the probability that the discriminator model assigns to the generated image.

At block 745, an action is taken using the new image output at block 735. In some instances, the action includes inputting into an image analysis model the new image. The image analysis model comprises a plurality of model parameters learned using a set of training data comprising images obtained from a same type of scanner as the second type of scanner. The action further includes analyzing, by the image analysis model, the new image; generating, by the image analysis model, an analysis result based on the analyzing of the new image; and outputting the analysis result. For example, an image analysis model may be trained to detect specific markers (CD8, Ki67, etc.) using the second digital image scanner (e.g., iScanHT). Now, using the first digital image scanner (e.g., DP200), slides have been scanned, and the obtained images have different characteristic profiles (e.g., different color and/or resolution profiles) as compared to images obtained from the second digital image scanner (e.g., iScanHT). Using the GAN model, the images scanned by the first digital image scanner (e.g., DP200) can be converted into images with similar characteristic profiles as images scanned by the second digital image scanner (e.g., iScanHT). Therefore, the image analysis models (such as detecting CD8, Ki67, PanCk, CD3, etc.) can take as input the new images converted to have similar characteristic profiles as images scanned by the second digital image scanner (e.g., iScanHT) and the image analysis models do not need to be retrained. The image analysis model may not be trained on images obtained from a same type of scanner as the first type of scanner (e.g., DP200). In other instances, the action includes training an image analysis model using a set of training data comprising the new image. Accordingly, with the new images generated by the GAN, it is possible to classify different markers without changing the image analysis models, and the images can be obtained through different types of scanners. Thereafter, a user may determine a diagnosis of a subject based on the analysis result. The user may administer a treatment with a compound based on (i) the analysis result, and/or (iii) the diagnosis of the subject.

The methods according to the present disclosure can render digital image analysis algorithms scanner agnostic—digital pathology images produced by any digital pathology slide scanner may be transformed into images suitable for analysis by the digital image analysis algorithms. The disclosed methods may be applicable for future image analysis algorithm development for new generation scanners by transforming images scanned by other scanners into images that can be used as training data paired with images produced by a new scanner. Moreover, the disclosed methods may be utilized to transfer data from different imaging sites located at different geographical areas to correct for image variations, for example, due to pre-analytical conditions.

Figure 8:
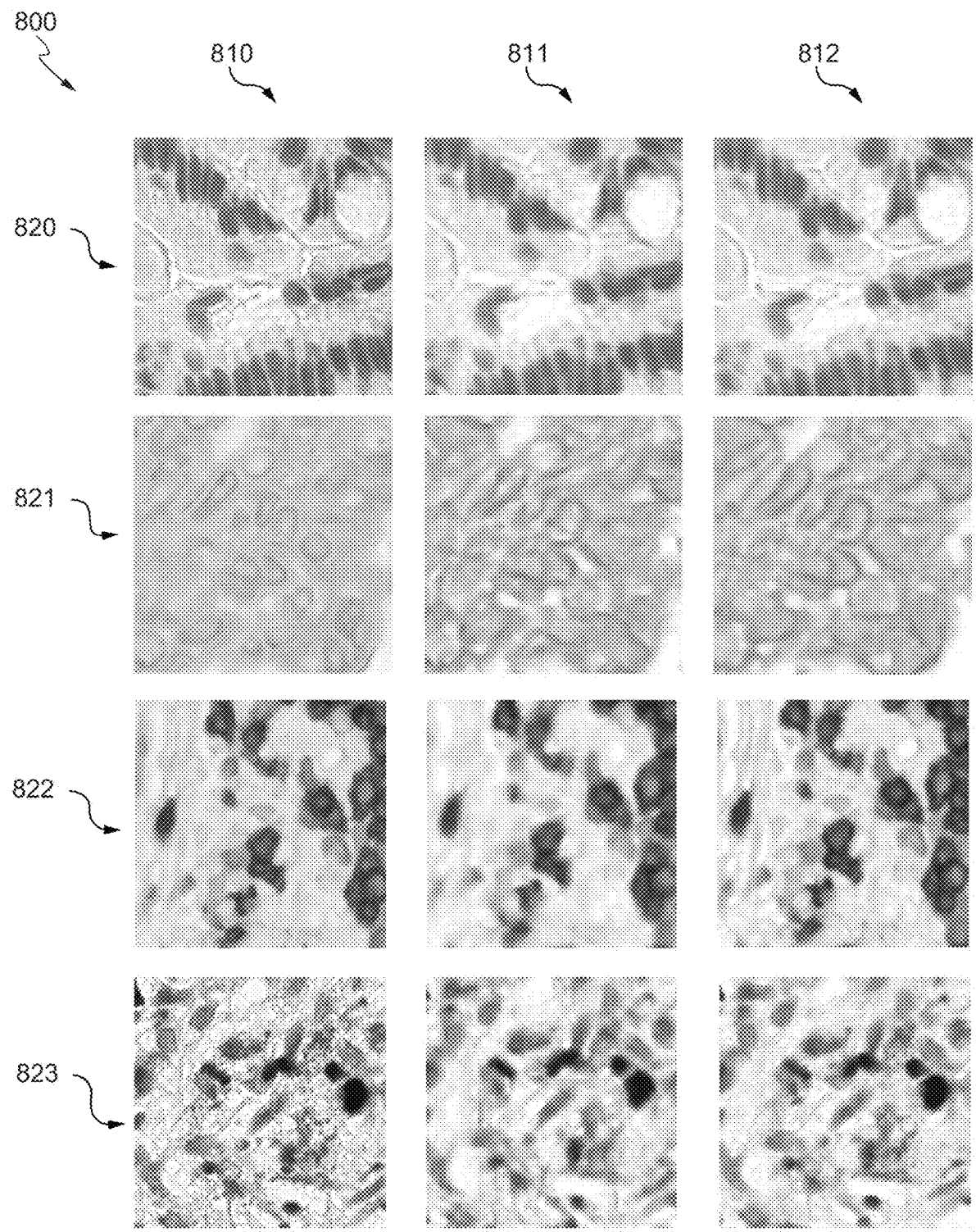
FIG. 8 shows examples of digital pathology images stained for different biomarkers according to various embodiments.

FIG. 8 illustrates examples of digital pathology images stained for different biomarkers according to some aspects of the present disclosure. The images are digital pathology images of four slides. The first row 820 includes a source image, a generated image, and a target image of a first slide. The second row 821 includes a source image, a generated image, and a target image of a second slide. The third row 822 includes a source image, a generated image, and a target image of a third slide. The fourth row 823 includes a source image, a generated image, and a target image of a fourth slide. Each row illustrates digital pathology images of slides that have been stained to reveal different biomarkers.

The source images of the four slides in the first column 810 are obtained from a first digital pathology slide scanner. The source images may be unsuitable for analysis using the available computerized digital pathology image analysis algorithms. The target images in the third column 812 are digital pathology images of the same four slides and may be obtained from a second digital pathology slide scanner. The target images (e.g., the desired images) in the third column 812 may be suitable for analysis using the available computerized digital pathology image analysis algorithms. Aspects of the present disclosure may enable transformation of the source digital pathology images (in the first column 810) into images having characteristics of the target digital pathology images (in the third column 812).

According to aspects of the present disclosure, a source digital pathology image may be input into a trained GAN, and the trained GAN may output a generated new image having characteristics of a target image suitable for analysis with existing computerized digital pathology image analysis algorithms. Referring to FIG. 8, the images in the second column 811 are new images generated by a trained GAN using the source images in the first column 810 as input to the GAN. As can be seen in FIG. 8, the generated images in the second column 811 have similar characteristics as the target images in the third column 812. Therefore, the generated digital pathology images in the second column 811 may be analyzed using the same computerized digital pathology image analysis algorithms that can be used to analyze the digital pathology images in the third column 812.

Figure 9:
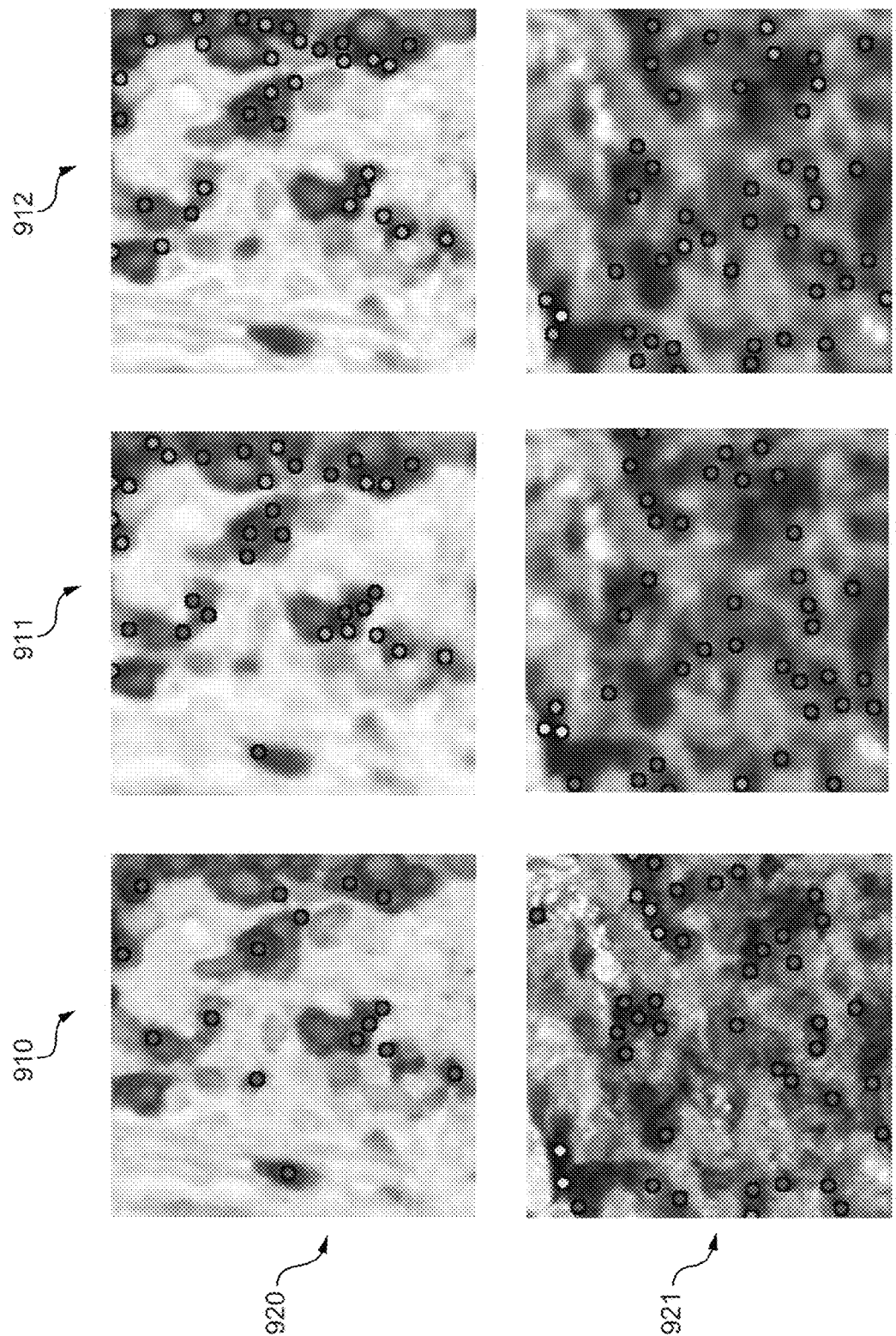
FIG. 9 shows additional examples of digital pathology images stained for different biomarkers and characteristic thereof according to various embodiments.

FIG. 9 illustrates additional examples of digital pathology images stained for different biomarkers according to some aspects of the present disclosure. The images are digital pathology images of two slides. The first row 920 includes a source image, a generated image, and a target image of a first slide. The second row 921 includes a source image, a generated image, and a target image of a second slide. The source images of the two slides in the first column 910 are obtained from a first digital pathology slide scanner. The source images may be unsuitable for analysis using the available computerized digital pathology image analysis algorithms. The target images in the third column 912 are digital pathology images of the same two slides and may be obtained from a second digital pathology slide scanner. The target images (e.g., the desired images) in the third column 912 may be suitable for analysis using the available computerized digital pathology image analysis algorithms. Aspects of the present disclosure may enable transformation of the source digital pathology images (in the first column 910) into images having characteristics of the target digital pathology images (in the third column 912).

According to aspects of the present disclosure, a source digital pathology image may be input into a trained GAN, and the trained GAN may output a generated new image having characteristics of a target image suitable for analysis with existing computerized digital pathology image analysis algorithms. Referring to FIG. 9, the images in the second column 911 are new images generated by a trained GAN using the source images in the first column 910 as input to the GAN. As can be seen in FIG. 9, the generated images in the second column 911 have similar characteristics (see shaded dots representative of similar characteristics in similar locations) as the target images in the third column 912. Therefore, the generated digital pathology images in the second column 911 may be analyzed using the same computerized digital pathology image analysis algorithms that can be used to analyze the digital pathology images in the third column 912.

V. EXAMPLES

Example 1. Correcting Differences in Multi-Scanners for Digital Pathology Images Using Deep Learning A CGAN was developed to transform six-different biomarker-expression images (DAB, multiplex-brightfield-IHC) acquired from an updated scanner (VENTANA DP200) into new high-quality synthetic images with their image characteristics similar to those scanned using a previous-generation scanner (VENTANA iScanHT). 12,740 images or 6,370 paired images with patch-size of 128×128 were used as paired iScanHT/DP200 images for training, comprised of biomarker expressions: CD34-aSMA(DAB/red), FAP/PanCK(yellow/purple), Perforin/CD3(DAB/red), Ki67/CD8(yellow/purple), FoxP3(DAB), and PD1(DAB), respectively. The same tissue slides were scanned using both iScanHT- and DP200-scanners, whereas patch images were selected and registered to ensure that the paired images were located in the same tissue section.

Visual assessment showed that input-DP200 images were transformed to output-iScanHT images and had comparable image characteristics with target images in different biomarker images. When the original-iScanHT algorithms were applied to the target and the generated-iScanHT images, the evaluation of detected tumor-cell counts between the output and the target-images resulted in Lin's concordance-correlation coefficient (CCC) of 0.86, 0.93, 0.95, 0.82, 0.80, and 0.97 for PD1, FoxP3, Ki67CD8, FAP/PanCK, CD34-aSMA, and Perforin/CD3 testing images, respectively. This demonstrates the feasibility of compensating for differences in multi-scanners and show a capability in applying algorithms such as the legacy-iScanHT algorithms to transformed-DP200 images without re-developing new image analysis algorithms. This image-to-image-translation approach has the potential to generate large datasets for future algorithm development of any new generation scanner, thereby images scanned by other scanners can be transformed and used as training data for a new scanner.

VI. ADDITIONAL CONSIDERATIONS

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method comprising:
   obtaining a source image of a biological specimen, wherein the source image is generated from a first type of scanner;
   inputting into a generator model a randomly generated noise vector and a latent feature vector from the source image as input data;
   generating, by the generator model, a new image based on the input data;
   inputting into a discriminator model the new image;
   generating, by the discriminator model, a probability for the new image being authentic or fake, wherein authentic means the new image has characteristics that are similar to characteristics of a target image, and fake means the new image does not have the characteristics that are similar to the characteristics of the target image, and wherein the characteristics of the target image are associated with a second type of scanner that is different from the first type of scanner;

determining whether the new image is authentic or fake based on the generated probability; and outputting the new image when the image is authentic.

2. The method of claim 1, wherein the biological specimen is mounted on a pathology slide, the first type of scanner is a first type of whole slide imaging scanner, and the second type of scanner is a second type of whole slide imaging scanner.

3. The method of claim 1, further comprising:

inputting into an image analysis model the new image, wherein the image analysis model comprises a plurality of model parameters learned using a set of training data comprising images obtained from a same type of scanner as the second type of scanner;

analyzing, by the image analysis model, the new image;

generating, by the image analysis model, an analysis result based on the analyzing of the new image; and outputting the analysis result.

4. The method of claim 3, wherein the image analysis model is not trained on images obtained from a same type of scanner as the first type of scanner.

5. The method of claim 1, further comprising training an image analysis model using a set of training data comprising the new image.

6. The method of claim 1, wherein the generator model and the discriminator model are part of a Generative Adversarial Network (GAN) model.

7. The method of claim 6, wherein:

the GAN model comprises a plurality of model parameters learned using a set of training data comprising one or more pairwise sets of images, wherein each pair of images within the one or more pairwise sets of images comprises a first image generated by the first type of scanner and a second image generated by the second type of scanner; and wherein the plurality of model parameters are learned using the set of training data based on minimizing a first loss function to train the discriminator model to maximize a probability of the set of training data and a second loss function to train the discriminator model to minimize a probability of a generated image sampled from the generator model and train the generator model to maximize the probability that the discriminator model assigns to the generated image.

8. The method of claim 3, further comprising: determining, by a user, a diagnosis of a subject based on the analysis result.

9. The method of claim 8, further comprising administering, by the user, a treatment with a compound based on (i) the analysis result, and/or (iii) the diagnosis of the subject.

10. A system comprising:

one or more data processors; and a non-transitory computer readable storage medium containing instructions which, when executed on the one or more data processors, cause the one or more data processors to perform actions including:

obtaining a source image of a biological specimen, wherein the source image is generated from a first type of scanner;

inputting into a generator model a randomly generated noise vector and a latent feature vector from the source image as input data;

generating, by the generator model, a new image based on the input data;

inputting into a discriminator model the new image;

generating, by the discriminator model, a probability for the new image being authentic or fake, wherein authentic means the new image has characteristics that are similar to characteristics of a target image, and fake means the new image does not have the characteristics that are similar to the characteristics of the target image, and wherein the characteristics of the target image are associated with a second type of scanner that is different from the first type of scanner;

determining whether the new image is authentic or fake based on the generated probability; and outputting the new image when the image is authentic.

11. The system of claim 10, wherein the biological specimen is mounted on a pathology slide, the first type of scanner is a first type of whole slide imaging scanner, and the second type of scanner is a second type of whole slide imaging scanner.

12. The system of claim 10, wherein the actions further include:

inputting into an image analysis model the new image, wherein the image analysis model comprises a plurality of model parameters learned using a set of training data comprising images obtained from a same type of scanner as the second type of scanner;

analyzing, by the image analysis model, the new image;

generating, by the image analysis model, an analysis result based on the analyzing of the new image; and outputting the analysis result.

13. The system of claim 12, wherein the image analysis model is not trained on images obtained from a same type of scanner as the first type of scanner.

14. The system of claim 13, wherein the actions further include training an image analysis model using a set of training data comprising the new image.

15. The system of claim 10, wherein:

the generator model and the discriminator model are part of a Generative Adversarial Network (GAN) model;

the GAN model comprises a plurality of model parameters learned using a set of training data comprising one or more pairwise sets of images, wherein each pair of images within the one or more pairwise sets of images comprises a first image generated by the first type of scanner and a second image generated by the second type of scanner; and wherein the plurality of model parameters are learned using the set of training data based on minimizing a first loss function to train the discriminator model to maximize a probability of the set of training data and a second loss function to train the discriminator model to minimize a probability of a generated image sampled from the generator model and train the generator model to maximize the probability that the discriminator model assigns to the generated image.

16. A computer-program product tangibly embodied in a non-transitory machine-readable storage medium, including instructions configured to cause one or more data processors to perform actions including:

obtaining a source image of a biological specimen, wherein the source image is generated from a first type of scanner;

inputting into a generator model a randomly generated noise vector and a latent feature vector from the source image as input data;

generating, by the generator model, a new image based on the input data;

inputting into a discriminator model the new image;

generating, by the discriminator model, a probability for the new image being authentic or fake, wherein authentic means the new image has characteristics that are similar to characteristics of a target image, and fake means the new image does not have the characteristics that are similar to the characteristics of the target image, and wherein the characteristics of the target image are associated with a second type of scanner that is different from the first type of scanner;

determining whether the new image is authentic or fake based on the generated probability; and outputting the new image when the image is authentic.

17. The computer-program product of claim 16, wherein the biological specimen is mounted on a pathology slide, the first type of scanner is a first type of whole slide imaging scanner, and the second type of scanner is a second type of whole slide imaging scanner.

18. The computer-program product of claim 16, wherein the actions further include:

inputting into an image analysis model the new image, wherein the image analysis model comprises a plurality of model parameters learned using a set of training data comprising images obtained from a same type of scanner as the second type of scanner;

analyzing, by the image analysis model, the new image;

generating, by the image analysis model, an analysis result based on the analyzing of the new image; and outputting the analysis result.

19. The computer-program product of claim 18, wherein the image analysis model is not trained on images obtained from a same type of scanner as the first type of scanner.

20. The computer-program product of claim 16, wherein:

the generator model and the discriminator model are part of a Generative Adversarial Network (GAN) model;

the GAN model comprises a plurality of model parameters learned using a set of training data comprising one or more pairwise sets of images, wherein each pair of images within the one or more pairwise sets of images comprises a first image generated by the first type of scanner and a second image generated by the second type of scanner; and wherein the plurality of model parameters are learned using the set of training data based on minimizing a first loss function to train the discriminator model to maximize a probability of the set of training data and a second loss function to train the discriminator model to minimize a probability of a generated image sampled from the generator model and train the generator model to maximize the probability that the discriminator model assigns to the generated image.

* * * * *